United States Patent [19]

DeBoer et al.

[11] Patent Number: 5,576,265
[45] Date of Patent: *Nov. 19, 1996

[54] COLOR FILTER ARRAYS BY STENCIL PRINTING

[75] Inventors: Charles DeBoer, Rochester; Michael E. Long, Bloomfield; Judith L. Fleissig, Rochester; Kathleen S. Hollis, Dalton; John R. Debesis, Penfield, all of N.Y.

[73] Assignee: Eastman Kodak Company, Rochester, N.Y.

[*] Notice: The term of this patent shall not extend beyond the expiration date of Pat. No. 5,229,232.

[21] Appl. No.: 428,469

[22] Filed: Apr. 26, 1995

[51] Int. Cl.$^6$ .......................... B41M 5/035; B41M 5/38
[52] U.S. Cl. .................. 503/227; 428/195; 428/913; 428/914; 430/5; 430/7; 430/321; 430/322; 430/416; 359/885
[58] Field of Search .................................. 428/195, 913, 428/914; 430/5, 7, 321, 322, 416; 503/227; 350/311; 427/261, 265

[56] References Cited

U.S. PATENT DOCUMENTS

| | | | |
|---|---|---|---|
| 4,081,277 | 3/1978 | Brault et al. | 96/38.2 |
| 4,541,830 | 9/1985 | Hotta et al. | 8/471 |
| 4,695,286 | 9/1987 | Vanier et al. | 8/471 |
| 4,698,651 | 10/1987 | Moore et al. | 503/227 |
| 4,701,439 | 10/1987 | Weaver et al. | 503/227 |
| 4,740,797 | 4/1988 | Yamamoto et al. | 346/74.4 |
| 4,743,582 | 5/1988 | Evans et al. | 503/227 |
| 4,753,922 | 6/1988 | Byers et al. | 503/227 |
| 4,757,046 | 7/1988 | Byers et al. | 503/227 |
| 4,769,360 | 9/1988 | Evans et al. | 503/227 |
| 4,775,657 | 10/1988 | Harrison et al. | 503/227 |
| 4,776,671 | 10/1988 | Sumi et al. | 350/311 |
| 4,786,148 | 11/1988 | Sekimura et al. | 350/339 |
| 4,923,860 | 5/1990 | Simons | 503/227 |
| 4,957,898 | 9/1990 | Weber | 503/227 |
| 4,962,081 | 10/1990 | Harrison et al. | 503/227 |
| 4,973,572 | 11/1990 | DeBoer | 503/227 |
| 4,975,410 | 12/1990 | Weber et al. | 503/227 |
| 4,988,665 | 1/1991 | Weber et al. | 503/227 |
| 5,166,126 | 11/1992 | Harrison et al. | 503/227 |
| 5,229,232 | 7/1993 | Longobardi et al. | 430/7 |
| B1 4,695,287 | 3/1990 | Evans et al. | 8/471 |

FOREIGN PATENT DOCUMENTS

| | | | |
|---|---|---|---|
| 2130781 | 4/1936 | United Kingdom | 503/227 |
| 2154355 | 9/1985 | United Kingdom | 503/227 |
| 2161971 | 1/1986 | United Kingdom | 503/227 |
| 2162674 | 2/1986 | United Kingdom | 503/227 |

Primary Examiner—B. Hamilton Hess
Attorney, Agent, or Firm—Raymond L. Owens

[57] ABSTRACT

A method for preparing a color filter array element is diclosed which includes the steps of forming an assembly by providing a support on which is coated a polymeric dye image-receiving layer; a stencil pattern on the dye image-receiving layer with holes corresponding to the desired color pixel array pattern; and a dye donor sheet over the stencil. The dye donor has a support film overcoated with a mixture of color dye, polymeric binder, and light absorber. The method further includes exposing the assembly to high intensity light to briefly heat the dye layer and thereby transfer the dye from the donor to the polymeric dye receiving layer so that a colored pattern of pixel elements are formed in or on the image-receiving layer.

5 Claims, 1 Drawing Sheet

COLOR FILTER ARRAYS BY STENCIL PRINTING

FIELD OF INVENTION

This invention relates to a color filter array element made by thermally transferring dyes through a stencil pattern.

BACKGROUND OF THE INVENTION

Liquid crystal display devices are known for digital display in electronic calculators, clocks, household appliances, audio equipment, etc. Liquid crystal displays are being developed to replace cathode ray tube technology for display terminals. Liquid crystal displays occupy a smaller volume than cathode ray tube devices with the same screen area. In addition, liquid crystal display devices usually have lower power requirements than corresponding cathode ray tube devices.

There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, none of the color array elements for liquid crystal display devices so far proposed have been successful in meeting all the user's needs.

One commercially available type of color filter array element that has been used in liquid crystal display devices for color display capability is a transparent support having a gelatin layer thereon which contains dyes having the additive primary colors red, green, and blue in a mosaic pattern obtained by using a photolithographic technique. To prepare such a color filter array element a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. Misalignment or improper deposition of color materials may occur during any of these operations. This method therefore contains many labor-intensive steps, requires careful alignment, is time-consuming and very costly. Further details of this process are disclosed in U.S. Pat. No. 4,081,277. U.S. Pat. No. 4,786,148 also discloses a color filter array element that employs certain pigments.

Color liquid crystal display devices generally include two spaced glass panels which define a sealed cavity that is filled with a liquid crystal material. For actively-driven devices, a transparent electrode is formed on one of the glass panels, which electrode may be patterned or not, while individually addressable electrodes are formed on the other of the glass panels. Each of the individual electrodes has a surface area corresponding to the area of one picture element or pixel. If the device is to have color capability, each pixel must be aligned with a color area, e.g. red, green, or, blue, of a color filter array. Depending upon the image to be displayed, one or more of the pixel electrodes is energized during display operation to allow full light, no light, or partial light to be transmitted through the color filter area associated with that pixel. The image perceived by a user is a blending of colors formed by the transmission of light through adjacent color filter areas.

In forming such a liquid crystal display device, the color filter array element to be used therein may have to undergo rather severe heating and treatment steps during manufacture. For example a transparent conducting layer, such as indium tin oxide (ITO), is usually vacuum sputtered onto the color filter array element which is then cured and patterned by etching. The curing may take place at temperature as high as 250° C. for times which may be as long as one hour or more. This is followed by coating with a thin polymeric alignment layer for the liquid crystals, such as a polyimide, followed by another curing step for up to several hours at an elevated temperature. These treatment steps can be very harmful to many color filter array elements, especially those with a gelatin matrix.

U.S. Pat. No. 4,776,671 describes a method of making a color filter array comprising the steps of forming on a transparent substrate an active alumina or active silica and then mounting on the active layer a metal mask having specified pattern holes. The method includes mounting on the metal mask a transfer sheet having an ink layer containing a capable of sublimation dye and/or a hot-melt dye capable of being vaporized; heating in a vacuum press to cause the dye in the ink layer to migrate in vapor state to the active film layer so that the film layer is dyed; and removing the transfer sheet and the metal mask, thereby sequentially forming the active film layer patterns corresponding to the pattern holes in the metal mask. Finally the method includes forming an overcoat layer for closing fine holes in said active film layer at the top thereof.

Polycarbonate dye image-receiving materials for color filter array elements are described in U.S. Pat. No. 4,962,081. In using these materials to form a color filter array element, the polymeric material is typically coated on a glass support, using spin coating in order to obtain a smooth coating. The dyes which color each pixel of the color filter array may then be thermally transferred in an image use fashion as described in U.S. Pat. No. 4,923,860, by means of a patterned flash of light onto a dye donor sheet held in close contact to the polycarbonate receiving layer. After the dye pixels are transferred to the receiver polymer, the dyes are fused into the polycarbonate layer by means of radiant heating, solvent vapor, or by contact with heated rollers. Because of the finite thickness of the dye donor sheet support used in this process, some blurring and rounding of the edges of the transferred dye is inevitable. If the blurring is too extensive, it can lead to mixing of the some of the color from one pixel element to the next, with concomitant loss of color purity. For this reason the support layer for the dye donor sheet is generally as thin as possible, in range of a few tens of microns thick. This makes the dye donor sheet fragile and difficult to handle without creasing.

SUMMARY OF THE INVENTION

A method for preparing a color filter array element comprising the steps of:
a) forming an assembly by providing:
  i) a support on which is coated a polymeric dye image-receiving layer;
  ii) a stencil pattern on the dye image-receiving layer with holes corresponding to the desired color pixel array pattern; and
  iii) a dye donor sheet over the stencil, the dye donor having a support film overcoated with a mixture of color dye, polymeric binder, and light absorber; and
b) exposing the assembly to high intensity light to briefly heat the dye layer and thereby transfer the dye from the donor to the polymeric dye receiving layer so that a colored pattern of pixel elements are formed in or on the image-receiving layer.

Another object of this invention is to prepare a color filter array from a metal stencil pattern without substantially heating the bulk of the metal pattern, so that dimensional stability of the pattern can be maintained during the preparation of the color filter array.

These objects are achieved in a method for preparing the color filter array element of the invention comprising the steps of:

a) forming an assembly by providing:
  i) a support on which is coated a polymeric dye image-receiving layer;
  ii) a stencil pattern on the dye image-receiving layer with holes corresponding to the desired color pixel array pattern; and
  iii) a dye donor sheet over the stencil, the dye donor having a support film overcoated with a mixture of color dye, polymeric binder, and light absorber; and
b) exposing the assembly to a high intensity strobe light flash to briefly heat the dye layer and thereby transfer the dye from the donor to the polymeric dye receiving layer so that a colored pattern of pixel elements are fixed into the image-receiving layer.

Advantages

A color filter array according to this invention provides a color filter array having sharp, well defined pixels of high color purity, with good dimensional accuracy, and without using thin and fragile donor films.

DETAILED DESCRIPTION OF THE PREFERRED EMBODIMENTS

Figure 1:
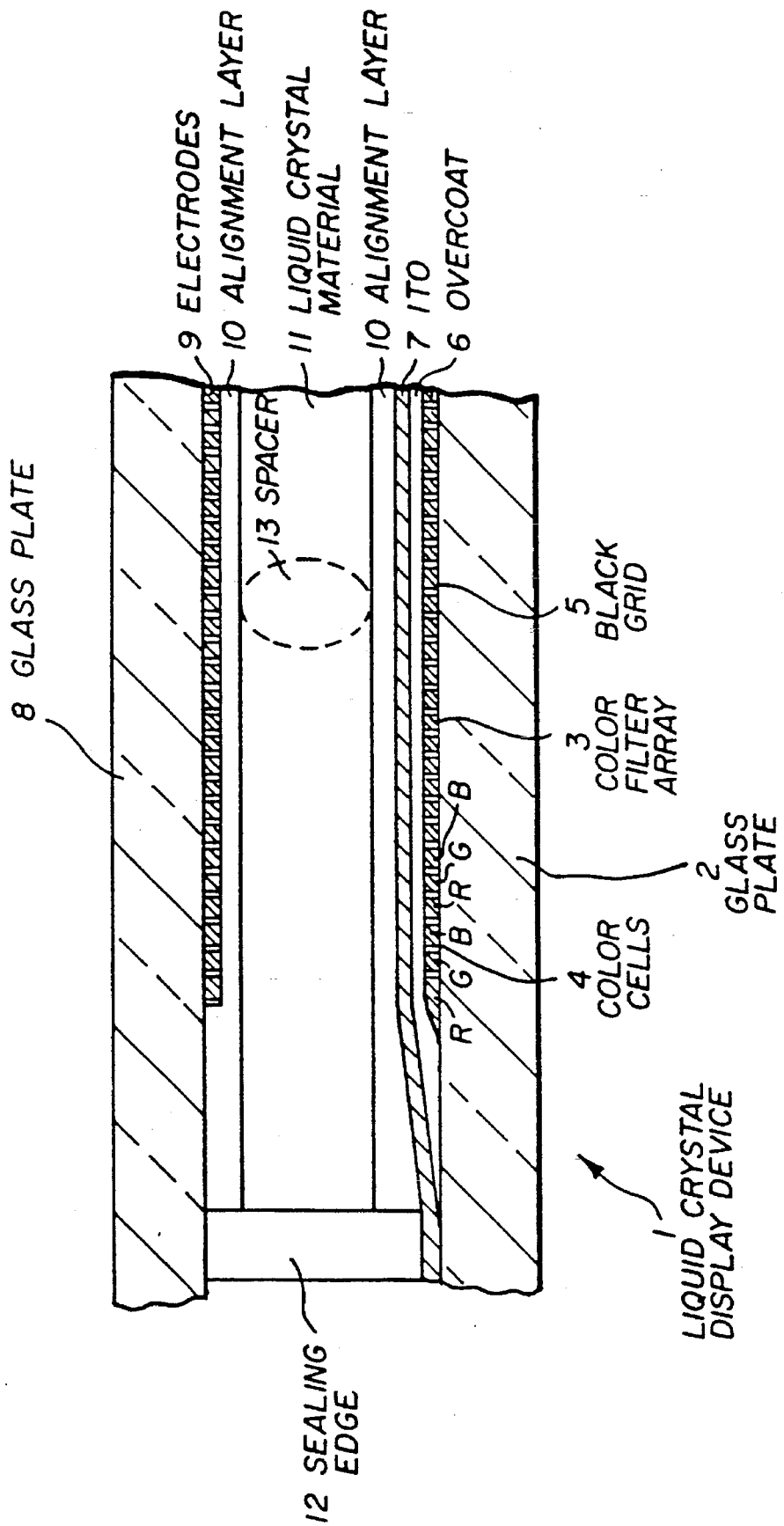
FIG. 1 is a schematic sectional view of a liquid crystal display device which includes an assembly in accordance with this invention.

A useful color filter array should have good thermal resistance, so that subsequent high temperature processing steps such as vacuum sputtering of conducting layers and curing of polymeric alignment layers will not degrade the color quality of the pixel elements of the array. The dyes which color the pixel elements of the array should also be chosen to have good fade resistance to the viewing light that illuminates them. The dyes must have good color purity, and the overall transmissivity of the color filter array should be as high as possible, consistent with good color purity and saturation, so that the power of the illuminating lamp need not be excessively high. Additional requirements on the color filter array are that the resolution of the array be high, so that the images appear sharp and detailed to the eye, and the overall uniformity of the image be good. The requirement of overall uniformity generally means that the overall dimensional accuracy of the color filter array must be high.

As noted above, the dye image-receiving layer contains a thermally transferred image comprising a repeating pattern of colorants in the polymeric dye image-receiving layer, preferably a mosaic pattern.

In a preferred embodiment of the invention, the mosaic pattern consists of a set of red, green, and blue additive primaries.

In another preferred embodiment of the invention, each area of primary color and each set of primary colors area separated from each other by an opaque area, e.g., black grid lines. This has been found to give improved color reproduction and reduce flare in the displayed image.

The size of the mosaic set is not critical since it depends on the viewing distance. In general, the individual pixels of the set are from about 50 to about 600 µm and do not have to be of the same size.

In a preferred embodiment of the invention, the repeating mosaic pattern of dye to form the color filter array element consists of uniform, square, linear repeating areas, with one color diagonal displacement as follows:

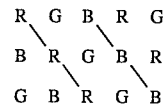

In another preferred embodiment, the above squares are approximately 100 µm.

The color filter array elements prepared according to the invention can be used in image sensors or in various electro-optical devices such as electroscopic light valves or liquid crystal display devices. Such liquid crystal display devices are described, for example, in U.K. Patents 2,154,355; 2,130,781; 2,162,674; and 2,161,971.

Liquid crystal display devices are commonly made by placing a material, which is liquid crystalline at the operating temperature of the device, between two transparent electrodes, usually indium tin oxide coated on a substrate such as glass, and exciting the device by applying a voltage across the electrodes. Alignment layers are provided over the transparent electrode layers on both substrates and are treated to orient the liquid crystal molecules in order to introduce a twist of, e.g., 90°, between the substrates. Thus, the plane of polarization of plane polarized light will be rotated in a 90° angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell, polarized light can be passed through the cell or extinguished, depending on whether or not an electric field is applied.

The polymeric alignment layer described above can be any of the materials commonly used in the liquid crystal art. Examples of such materials include polyimides, polyvinyl alcohol, and methyl cellulose.

The transparent conducting layer described above is also conventional in the liquid crystal art. Examples of such materials include indium tin oxide, indium oxide, tin oxide, and cadmium stannate.

The FIGURE shows diagrammatically a part of liquid crystal display device 1 having a glass plate 2 of glass, quartz, or other suitable material. A color filter array 3 comprises red (R), green (G), and blue (B) color cells or pixel cells 4 corresponding to pixels. Black grid lines 5 separate each color cell. The color filter array 3 is provided with a polymeric protective overcoat layer 6 and a transparent conducting layer of ITO 7.

In the color filter array of the invention the polymeric protective overcoat layer 6, which overlies the image-receiving layer that contains the transferred dye image, may be formed by photopolymerizing a layer containing a cycloaliphatic epoxide compound such as 3,4-epoxycyclohexylmethyl-3,4-epoxycyclohexylcarboxylate, and an onium salt of a Lewis acid as a photoinitiator, as described more fully hereinafter. In the FIGURE the polymeric protective overcoat layer 6 is depicted extending beyond the viewing area of the liquid crystal display device 1. However, said polymeric protective overcoat layer 6 can be coextensive with the underlying transferred dye image in the receiving layer. The polymeric protective overcoat layer 6 is more fully described in U.S. Pat. No. 5,166,126 the disclosure of which is incorporated herein by reference.

The other glass plate 8 has electrodes 9 provided thereon which define pixels, either because the electrodes 9 and the transparent conducting layer of ITO 7 constitute a cross-bar system in which the crosslinks define the pixels (passive drive), or because the electrodes 9 constitute picture electrodes which are driven by a system (not shown) of switching elements, drive, and data lines (active drive), in which case the electrodes 9 may have a single flat structure.

A layer of liquid crystal material 11, which is provided with alignment layers 10, is present between the two supporting glass plates 2 and 8. The two plates are held at a substantially constant distance from each other by means of a sealing edge 12 and spacers 13. In practice, the device is further provided with polarizers, reflectors, etc. in the conventional manner.

The dye image-receiving layer used in forming the color filter array element of the invention may comprise, for example, those polymers described in U.S. Pat. Nos. 4,695,286; 4,740,797; 4,775,657; and 4,962,081, the disclosures of which are hereby incorporated by reference. In a preferred embodiment, polycarbonates having a glass transition temperature greater than about 200° C. are employed. In another preferred embodiment, polycarbonates derived from a methylene substituted bisphenol A such as 4,4'-(hexhydro-4,7-methanoindan -5-ylidene)-bisphenol are employed. In general, good results have been obtained at a coverage of from about 0.25 to about 5 mg/m².

The support used in the invention is preferably glass such as borax glass, borosilicate glass, chromium glass, crown glass, flint glass, lime glass, potash glass, silica-flint glass, soda glass, and zinc-crown glass. In a preferred embodiment, borosilicate glass is employed.

A dye-donor element that is used to form the color filter array element of the invention comprises a support having thereon a dye layer. Any dye or mixture of dyes can be used in such a layer provided they are transferable to the dye image-receiving layer of the color array element of the invention by the action of heat. Especially good results have been obtained with sublimable dyes. Examples of sublimable dyes include anthraquinone dyes, e.g. Sumikalon Violet RS® (Sumitomo Chemical Co., Ltd.); Dianix Fast Violet 3R-FS® (Mitsubishi Chemical Industries, Ltd.); and Kayalon Polyol Brilliant Blue N-BGM® and KST Black 146® (Nippon Kayaku Co., Ltd.); azo dyes such as Kayalon Polyol Brilliant Blue BM®; Kayalon Polyol Dark Blue 2BM®; and KST Black KR® (Nippon Kayaku Co., Ltd.); Sumickaron Diazo Black 5G® (Sumitomo Chemical Co., Ltd.); and Miktazol Black 5GH® (Mitsui Toatsu Chemicals, Inc.); direct dyes such as Direct Dark Green B® (Mitsubishi Chemical Industries, Ltd.); and Direct Brown M® and Direct Fast Black D® (Nippon Kayaku Co., Ltd.); acid dyes such as Kayanol Milling Cyanine 5R® (Nippon Kayaku Co., Ltd.); basic dyes such as Sumicacryl Blue 6G® (Sumitomo Chemical Co., Ltd.); and Aizen Malachite Green® (Hodogaya Chemical Co., Ltd.); or any of the dyes disclosed in U.S. Pat. Nos. 4,541,830; 4,698,651; 4,695,287; 4,701,439; 4,757,046; 4,743,582; 4,769,360; and 4,753,922, the disclosures of which are hereby incorporated by reference.

Suitable dyes are further illustrated by the following structural formulas:

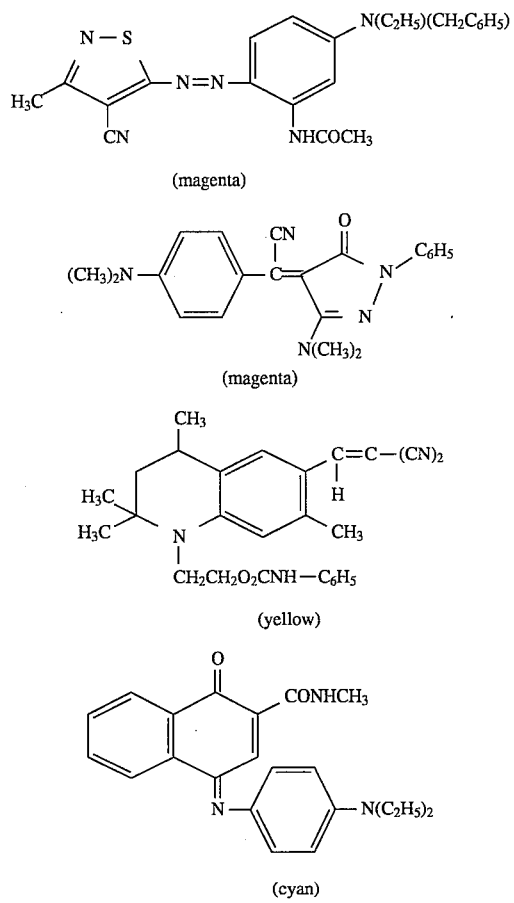

The above subtractive dyes can be employed in various combinations to obtain the desired red, blue, and green additive primary colors, as disclosed in U.S. Pat. Nos. 4,957,898; 4,975,410; and 4,988,665, the disclosures of which are hereby incorporated by reference. The dyes can be mixed within the dye layer or transferred sequentially if coated in separate dye layers and can be used at a coverage of from about 0.05 to about 1 g/m².

Various methods can be used to transfer dye from the dye donor to the image-receiving layer on the support to form the color filter array element of the invention. For example, a high intensity light flash technique can be used with a dye-donor containing an energy absorptive material such as carbon black or a light-absorbing dye. This method is more fully described in U.S. Pat. No. 4,923,860, the disclosure of which is incorporated herein by reference.

In another embodiment of the invention, the heating is done by means of a laser, using a dye-donor element comprising a support having thereon a dye layer and an absorbing material for the laser. Whichever of these known thermal dye transfer methods is selected for making the color filter array element of the invention, the heating causes the dyes to transfer to the receiving layer.

Any material that absorbs the laser energy or high intensity light flash described above can be used as the absorbing material, for example, carbon black or non-volatile infrared-absorbing dyes or pigments which are well known to those skilled in the art. In a preferred embodiment, cyanine infrared absorbing dyes are employed as described in U.S. Pat. No. 4,973,572, the disclosure of which is hereby incorporated by reference.

Irrespective of whether laser or flash lamp heating is used to transfer the dye from the donor to the polymeric image-receiving layer, the intensity of the radiation should be high enough and the duration of the flash should be short enough that there is no appreciable heating of the assembly with concomitant significant dimensional change in the pattern of color cells or pixel cells 4. In this invention, the preferred duration of flash is from 1 microsecond to 30 milliseconds. The preferred intensity of the flash is from 0.01 Watts per square micrometer to 10 Watts per square micrometer.

The pattern of color cells or pixel cells 4 in this invention are defined by the stencil mask. The dye cloud that is generated by high intensity flash or laser exposure of the dye donor films fills the space between the dye donor and the polymeric dye-receiver layer to the limits of the holes in the stencil. The resulting pixels have sharp, hard edges that are well defined by the stencil. The flash or laser exposure of the assembly of dye donor, stencil, and polymeric dye-receiver may be done through the donor, i.e. with the light source facing the dye donor, or though the receiver, i.e. with the light source facing the support for the polymeric dye-receiver layer, in which case the light travels through the holes of the stencil, is absorbed and heats the dye donor to transfer dye only in the open areas of the stencil. This may offer advantages in keeping the closed areas of the stencil clean from excess dye.

The stencil of this invention may be prepared by different methods such as electroforming, chemical etching, electrical discharge machining, laser beam machining, or the like, and may comprise different materials including metals such as nickel, copper, chromium or iron, and polymers such as polyethyleneterephthalate, a polyimide such as Kapton, sold by the dupont Corporation, or a crosslinked polymeric photoresist material such as polyvinylcinnamate. In a preferred embodiment of the invention, the stencil is made of nickel which is electroplated onto a flat copper electrode which is patterned with a photoresist. The preferred thickness of the nickel stencil in this invention is between 0.0005 inches and 0.004 inches thick.

After the dyes are transferred to the receiver, the image can be treated to further diffuse the dye into the dye-receiving layer in order to stabilize the image. This can be done by radiant heating, by exposure to a solvent vapor which will soften or swell the polymeric dye-receiving layer, or by contact with heated rollers. The fusing aids in preventing fading and surface abrasion of the image upon exposure to light and also tends to prevent crystallization of the dyes.

A series of examples of the color filter array elements prepared by these methods are described below.

Example 1

A 63 mm square of glass, 1.4 mm thick, was spin coated at 2000 rpm with a 10% solution of 4,4'-(hexahydro-4,7-methanoindan-5-ylidene)bisphenol polycarbonate in toluene and allowed to dry while spinning. A nickel stencil 0.001 inches thick was placed on top of the glass. The stencil had holes approximately 90 by 130 micrometers in size, spaced apart on a center to center distance of 510 micrometers. The center to center distance of each lines of holes was 160 micrometers. On top of an coextensive with the nickel stencil was a 100 micrometer thick film of polyethyleneterephthalate which had been overcoated with a mixture consisting of 0.22 $g/m^2$ Yellow dye A of U.S. Pat. No. 4,957,898, incorporated herein by reference; 0.26 $g/m^2$ Magenta dye I of U.S. Pat. No. 4,957,898, incorporated herein by reference; 0.25 $g/m^2$ Raven 1255® carbon, dispersed in 2-butanone and cellulose acetate propionate; 0.20 $g/m^2$ cellulose acetate propionate (2.5% acetyl, 46% propionyl); and 0.008 $g/m^2$ Fluorad FC-431® fluorosurfactant (a product of 3M Corp.). The assembly was exposed to a high intensity xenon flash lamp as previously described through the dye donor film, and then the dye donor film and the stencil were removed. The image on the glass was then fused into the 4,4'-(hexahydro-4,7-methanoidan-5-ylidene)bisphenol polycarbonate layer by placing the glass in a container saturated with anisole vapor for 5 minutes. The resulting image was a sharp, clear, and faithful rendition of the holes in the nickel stencil.

Example 2

The procedure of Example 1 was repeated, but the assembly was exposed to the high intensity flash through the side opposite the dye donor, that is, through the glass support side. Again, the image faithfully reproduced the hole pattern of the stencil.

Example 3

Another square of glass was prepared in the same way as Example 1, but the stencil used as a 0.4 mm thick sheet of brass having an array of 1 mm holes drilled through it. Again, the image faithfully reproduced the pattern of holes, but the density of the image was lower, because the thickness of the brass sheet was larger than the preferred thickness for this invention.

Example 4

Another square of glass was prepared in the same way as Example 1, but the stencil used was a 100 micrometer thick film of polyethyleneterephthalate having a triangular area cut from it with a razor blade. Again, the image produced faithfully reproduced the pattern of the stencil.

The invention has been described in detail with particular reference to certain preferred embodiments thereof, but it will be understood that variations and modifications can be effected within the spirit and scope of the invention.

PARTS LIST 1 liquid crystal display device
2 glass plate
3 color filter array
4 color cells or pixel cells
5 black grid lines
6 polymeric protective overcoat layer
7 ITO
8 glass plate
9 electrodes
10 alignment layer
11 liquid crystal material
12 sealing edge
13 spacers

We claim:

1. A method for preparing a color filter array element comprising the steps of:

a) forming an assembly by providing:

i) a support on which is coated a polymeric dye image-receiving layer;

ii) a stencil pattern on the dye image-receiving layer with holes corresponding to the desired color pixel array pattern; and iii) a dye donor sheet over the stencil, the dye donor having a support film overcoated with a mixture of color dye, polymeric binder, and light absorber; and b) exposing the assembly to high intensity light to briefly heat the dye layer and thereby transfer the dye from the donor to the polymeric dye receiving layer so that a colored pattern of pixel elements are formed in or on the image-receiving layer.

2. The method according to claim 1 wherein the light absorber is carbon.

3. A dye transfer assembly for forming a color filter array comprising:

a) a support on which is coated a polymeric dye image-receiving layer;

b) a stencil pattern on the support with holes corresponding to a desired color filter array pattern; and c) a dye donor sheet comprising a support film overcoated with a mixture of color dye, polymeric binder, and light absorber.

4. In a method for making a color filter array comprising the steps of forming a dye transfer assembly by:

a) providing a support on which is coated a polymeric dye image-receiving layer;

b) providing a stencil pattern on the support with holes corresponding to a desired color filter array pattern;

c) a dye donor sheet comprising a support film overcoated with a mixture of color dye, polymeric binder, and light absorber; and forming the color filter array by d) exposing the assembly to a high intensity light flash.

5. In the method according to claim 4 wherein the light absorber is carbon.

* * * * *